(12) United States Patent
Bhat et al.

(10) Patent No.: US 12,481,826 B2
(45) Date of Patent: Nov. 25, 2025

(54) SYSTEMS AND METHODS FOR SELECTING NEURAL NETWORK MODELS FOR BUILDING A CUSTOM ARTIFICIAL INTELLIGENCE STACK

(71) Applicant: Salesforce, Inc., San Francisco, CA (US)

(72) Inventors: Meghana Bhat, Palo Alto, CA (US); Semih Yavuz, Redwood City, CA (US); Rui Meng, San Francisco, CA (US); Yingbo Zhou, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 231 days.

(21) Appl. No.: 18/498,886

(22) Filed: Oct. 31, 2023

(65) Prior Publication Data
US 2025/0005276 A1   Jan. 2, 2025

Related U.S. Application Data

(60) Provisional application No. 63/511,446, filed on Jun. 30, 2023.

(51) Int. Cl.
*G06F 40/20*   (2020.01)

(52) U.S. Cl.
CPC .................. *G06F 40/20* (2020.01)

(58) Field of Classification Search
None
See application file for complete search history.

(56) References Cited

U.S. PATENT DOCUMENTS

2018/0365220 A1*  12/2018  Chakraborty ........... G06F 40/30
2019/0294668 A1*   9/2019  Goel .................. H04N 21/4788

* cited by examiner

*Primary Examiner* — Quynh H Nguyen
(74) *Attorney, Agent, or Firm* — Haynes and Boone, LLP

(57) ABSTRACT

Embodiments described herein provide a system for selecting a neural network based natural language processing (NLP) model for building a custom artificial intelligence (AI) stack for a user. The system includes a communication interface that established connections to one or more external servers hosting one or more neural network based NLP models, a memory; and a processor executing operations including: selecting a source document based on a custom NLP application; generating, by a first language model, a summary of the source document; generating, by a second language model, one or more questions based on at least one of the summary or the source document; transmitting, via the communication interface, the one or more questions to the one or more neural network based NLP models; receiving, via the communication interface, one or more answers generated by the one or more neural network based NLP models.

20 Claims, 11 Drawing Sheets

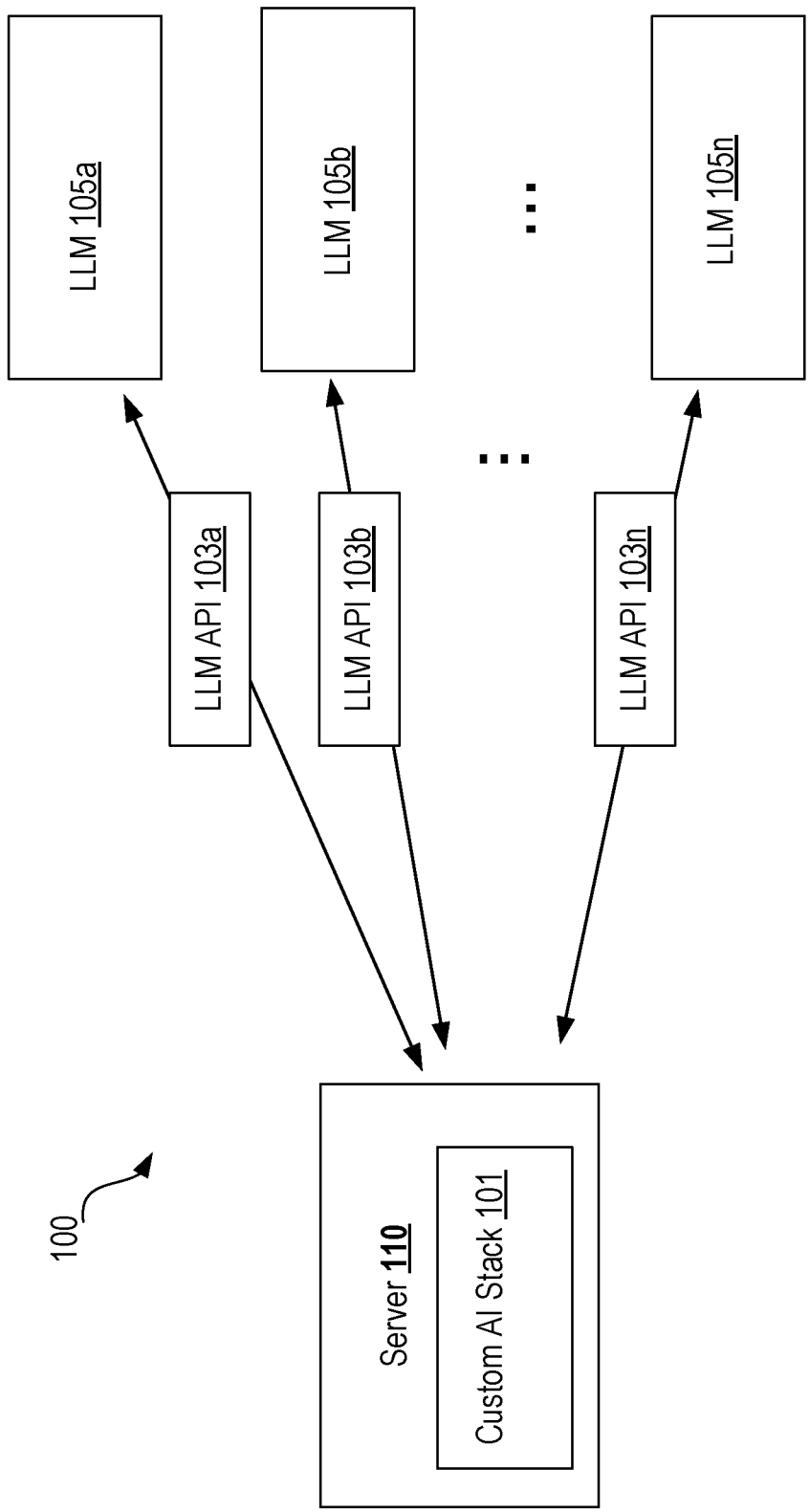

| Question | Choices |
|---|---|
| Q1: Is the question answerable from the given context and is unambiguous? | A. Yes B. No |
| Q2: How much of the passage is needed as context to answer the question? | A. Only a sentence or two B. More than 2 sentences but lesser than a paragraph C. At least a third of the entire passage D. Most of the passage |
| Q3: Does the question require multiple passes through the passage? | A. Yes B. No |

FIG. 4A

| Evaluation Metric | QG - Passage | QG - Summary |
|---|---|---|
| Q1: Unambiguity | 96.6% | 94.7% |
| Q2: Context Length | | |
| A sentence or less than a paragraph | 79.3% | 75.7% |
| At least a third or most of the passage | 20.7% | 24.3% |
| Q3: Multi-pass of the passage | 24.4% | 31% |

FIG. 4B

| Model | QG-Passage | | QG-Summary | |
|---|---|---|---|---|
| | w/o context | w/ context | w/o context | w/ context |
| ChatGPT | 2.78 | 2.93 | 2.67 | 2.82 |
| Alpaca-13B | 2.27 | 2.09 | 2.04 | 2.09 |
| LlaMa-13B | 1.22 | 1.47 | 0.98 | 1.28 |
| Alpaca-7B | 2.04 | 1.96 | 1.64 | 1.89 |
| LlaMa-7B | 0.89 | 1.12 | 0.66 | 0.78 |

FIG. 6B

SYSTEMS AND METHODS FOR SELECTING NEURAL NETWORK MODELS FOR BUILDING A CUSTOM ARTIFICIAL INTELLIGENCE STACK

CROSS REFERENCE(S)

The instant application is a nonprovisional of and claim priority under 35 U.S.C. 119 to U.S. provisional application No. 63/511,446, filed Jun. 30, 2023, which is hereby expressly incorporated by reference herein in its entirety.

This application is related to co-pending U.S. nonprovisional application Ser. Nos. 18/496,523 and 18/496,513, both filed Oct. 27, 2023, which are hereby expressly incorporated by reference herein in their entirety.

TECHNICAL FIELD

The embodiments relate generally to machine learning systems for natural language processing, and more specifically to systems and methods for selecting neural network models for building a custom artificial intelligence (AI) stack.

BACKGROUND

Machine learning systems have been widely used in natural language processing. For example, large language models (LLMs) have been used in various complex natural language processing (NLP) tasks in a variety of applications, such as Information Technology (IT) trouble shoot, customer service, online learning, and/or the like. However, the capabilities, limitations, and differences in various LLMs are not well understood. It can be challenging for a user to select a LLM for a specific use.

BRIEF DESCRIPTION OF THE DRAWINGS

FIG. 1A is a simplified diagram illustrating a LLM stack selection framework, according to some embodiments.

FIGS. 4A and 4B illustrate exemplary prompts used in the operations of the LLM selection framework, according to some embodiments.

FIGS. 6A-6C provide charts illustrating exemplary performance of different embodiments described herein.

Figure 1B:
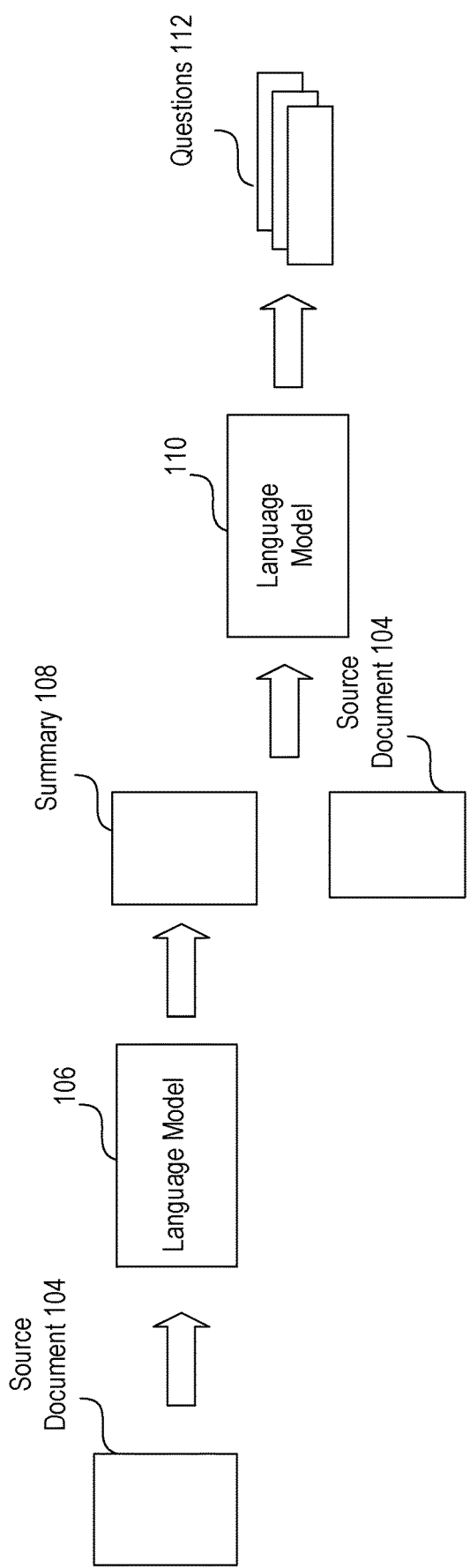
FIGS. 1B and 1C illustrate detailed operations of the LLM stack selection framework, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters.

Overview

LLMs have been employed in the form of a chatbot application in different industries, such as Information Technology (IT) trouble shoot, customer service, online learning, and/or the like. For example, long-form question answering is a type of NLP tasks that generate an explanatory answer to a question, often widely used in the chatbot application, e.g., a banking chatbot conducting a conversation with a user to process a fraud report, an online learning avatar explaining a science project to students at different levels, and/or the like. As developing and/or training a proprietary LLM can be costly and labor intensive, more and more enterprises choose to subscribe to commercially available LLMs such as GPT-3.5, GPT-4.0, Llama, Alpaca, and/or the like, to build their specific AI applications. With a variety of commercially available LLMs in the market, selecting an LLM for a custom AI application in a particular domain remains challenging.

Embodiments described herein provide a LLM recommendation mechanism for building a customized generative AI stack Specifically, given a target NLP task such as a chatbot application implementing long-form question answering, a source document for evaluation in the relevant domain of the target chatbot application may be selected. A language model may then generate a summary of the source document, based on which a number of questions may be generated based on the summary and a number of corresponding answers distilled from the summary. The generated questions may then be fed to different external LLMs to generate answers, which are evaluated based on one or more metrics (e.g., factual consistency, accuracy, etc.) to determine the LLM with the highest overall score. The best performing LLM may be recommended to the user on a user interface.

In this way, a custom AI stack may be built by choosing one or more LLMs that are most suitable to a particular domain and design of the AI application. The generative AI creation stack may allow the creation of a flexible generative chat platform that allows the consumer to not only design the application, but also to design the generative capability that powers the application, e.g., by injecting tenant data for training, and/or the like.

FIG. 1A is a simplified diagram illustrating an example operation of an LLM selection framework 100 according to some embodiments. The framework 100 may comprise a server 110 on which a custom AI stack 101 may be built. The server 110 is communicatively coupled to one or more LLMs 105a-n via one or more LLM application programming interfaces (APIs) 103a-n. In one implementation, the one or more LLMs 105a-n may be hosted by vendor servers that are external to the server 110, which are accessible through a communication network. In one implementation, one or more LLMs 105a-n may be proprietary LLMs hosted on the server 110, and/or a copy of vendor-provided LLMs 105a-n may be implemented on the server 110.

In one embodiment, the server 110 may build and/or host a custom AI stack, such as AI applications implementing a specific natural language processing (NLP) task in a specific domain, and/or the like. For example, the domains include physics, entertainment, history, computer science, social sciences, society, economics, medicine, and sports. One or more LLMs from LLMs 105a-n may then be selected to build the AI application. Additional details of building a custom AI stack using selected external LLMs may be found in U.S. patent application Ser. No. 18/496,523.

In one embodiment, the server 110 may comprise an AI gateway that sends a task request to one or more selected LLMs. For example, the task request may comprise a long-form question-answering task to answer the question "which health provider in California has the best pediatricians" and one or more source documents containing information of hospitals in California and the description of each pediatrician in all the health providers are provided as context information based on which the question is to be answered. The task request may further comprise a user prompt to guide the selected LLM to perform the task, e.g., "answer the input question based on the input document with reasoning and explanatory details." A corresponding LLM APIs (one of 103a-n) may receive the task request and translate the task request, e.g., the question, source document, prompt for the LLM, etc., into a specific input format for the vendor-specific LLM to generate an answer. Additional details of the communication between an AI gateway at the server 110 and vendor-specific LLM APIs 103a-n may be found in U.S. patent application Ser. No. 18/496,513.

FIG. 1B is a simplified diagram illustrating aspects of generating testing questions for LLM selection using framework 100 shown in FIG. 1A, according to some embodiments. In one embodiment, to select one or more LLMs for building a custom AI stack in a particular domain, a source document 104 in the domain may be retrieved at the server. For example, the source document 104 may comprise annotated data (and/or metadata) that relates to a domain of the source document.

A language model 106 may be employed to generate a summary 108 of source document 104. In one implementation, the language model 106 may be a summarization model implemented at server 110 in FIG. 1A. In another implementation, the language model 106 may be one of LLMs 105a-n, and therefore the source document 105 is sent to the external LLM together with a user prompt to generate a summary of the source document 105.

In one embodiment, the generated summary 108 may be passed to a language model 110 to generate a plurality of questions 112 based on summary 108. For example, the language model 110 may be the same or a different language model implemented at server 110 in FIG. 1A. In another example, the language model 110 may be one of LLMs 105a-n, and therefore the summary 108 is sent to the same or a different external LLM than model 106, together with a user prompt to generate a plurality of questions based on the summary 108.

It is to be noted that language models 106 and 108 are shown to be two models for illustrative purpose only. In one implementations, language models 106 and 108 may be the same LLM, e.g., ChatGPT, etc.

In some embodiments, the source document 104 may also be fed to the language model 110 as additional context for generating one or more questions.

It is to be noted that, when the language model 110 generates questions based on both summary 108 and source document 104, questions 112a represent questions generated from summary 108 only ("QG-Summary"), and questions 112b represent questions generated from source document 104 only ("QG-Passage"), collectively referred to as questions 112. In some embodiments, questions 112 may only be generated from summary 108, e.g., QG-Summary.

In some embodiments, one or more "complex" questions may be selected from the generated questions 112 (e.g., questions 112b generated based on source document 104) for question answering. For example, FIGS. 4A and 4B illustrate example prompts used to filter out "less complex" questions from questions 112 generated by the language model 110. As shown in FIGS. 4A and 4B, the prompt may include questions Q1, Q2, and Q3, which respectively refers to evaluation metrics of unambiguity, context length, and multi-pass of the passage. The language model 110 may determine the percentage of questions 112a (and 112b, if any). For example, the percentage of questions 112a with unambiguity is 94.7%. The language model 110 may be prompted with a set of threshold values top_p={0.8, 0.9, 1} respectively for questions Q1, Q2, and Q3. Second language model 110 may disregard the questions corresponding to the metrics of which the percentages are below the respective threshold values. For example, second language model 110 may select 1278 "complex" questions (94.7% of a total of 1350 questions) for question answering because 94.7% is above 0.8, but disregard the metrics of context length and multi-pass of the passage due to their percentages are below respective threshold values of 0.9 and 1. In some embodiments, second language model 110 includes ChatGPT.

Figure 1C:
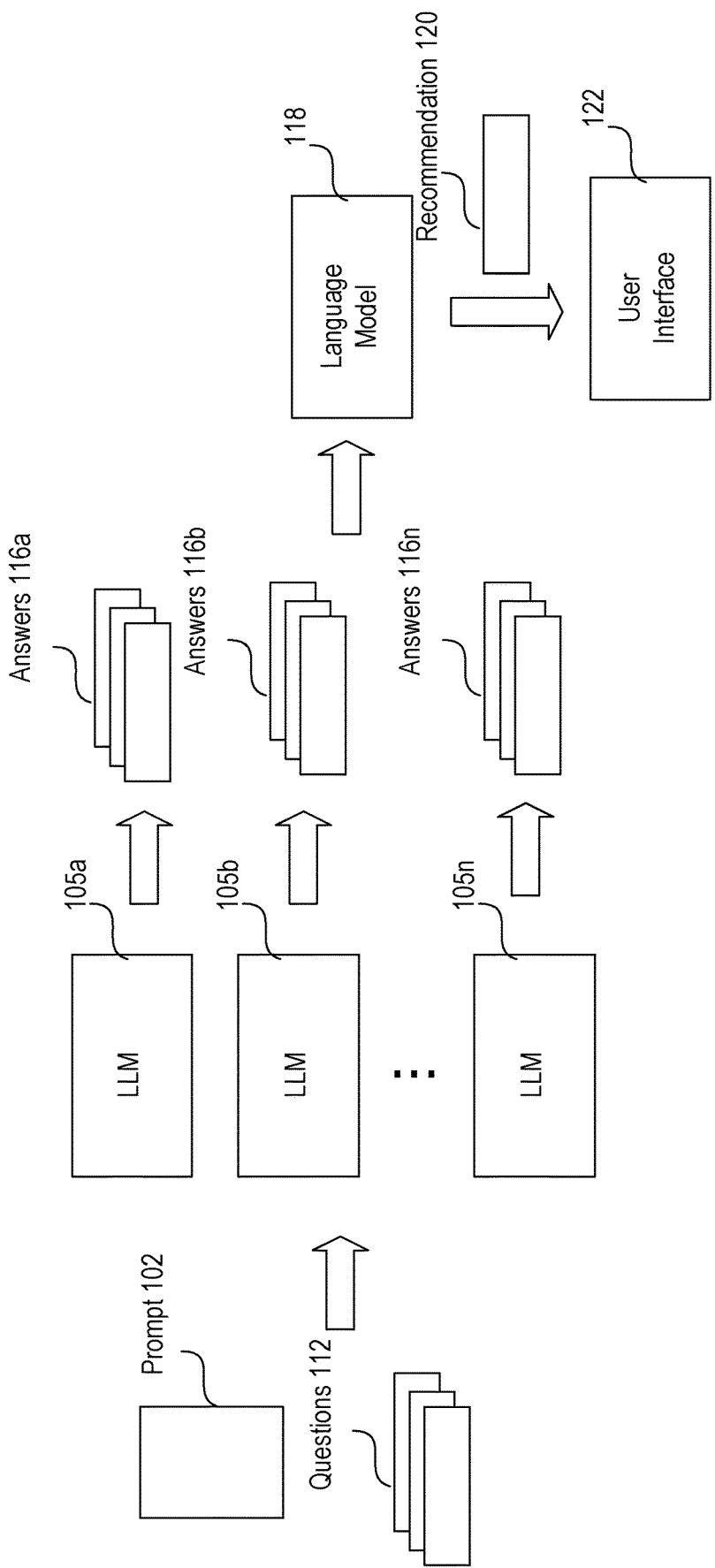

FIG. 1C is a simplified diagram illustrating aspects of evaluating LLMs 105a-n using generated testing questions 112, according to one or more embodiments described herein. In one embodiment, the generated questions 112 may be fed to the pool of LLMs 105a-n through LLM APIs 103a-n. e.g., together with a prompt 102 to guide the LLM to generate a long-form answer to the input question. LLMs 105a-n may then respectively generate a plurality of sets of answers 116a, 116b, . . . , 116n based on an input of a combination of questions 112 and prompt 102. For example, each set of answers 116a may include one or more answers to questions 112 answered by the corresponding LLM 105a.

For example, each LLM 105a-n may be prompt to generate an answer to the generated question using a prompt 102 similar to the following:

Given the context, answer the question below:
Context: {context}
Question: {question}
Answer: {Answer}

In one embodiment, a language model 118, which may be the same or different from language models 106 or 108, may receive and evaluate the answers 116a-n. The language model 118 may rank the performance (e.g., of long-form question answering) of LLMs 105a-n based on answers 116a, 116b, . . . , 116n. For example, the language model 118 may be prompted to generate respective specificity scores based on one or more metrics, such as coherence, relevance, factual consistency, and accuracy. The language model 118 may be provided the definitions of the metrics. In some embodiments, coherence refers to an answer being well-structured and well-organized (e.g., not being a heap of related information), relevance refers to an answer being relevant to the question and the context (e.g., being concise and not drifting from the question), factual consistency refers to the context being the primary source for an answer (e.g., answer not containing fabricated information and not entailing information in the context), and accuracy refers to an answering being satisfactory and complete to a question. In various embodiments, one or more evaluation methods are used. For example, the evaluation methods include ROUGE, ROUGE-WE, BertScore, S3, MoverScore, SummaQA, etc.

Figure 6A:
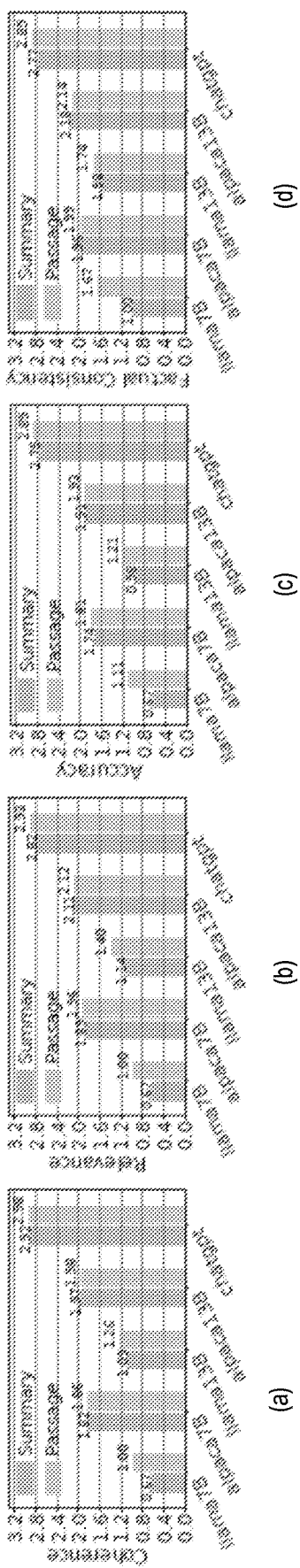
Figure 6C:
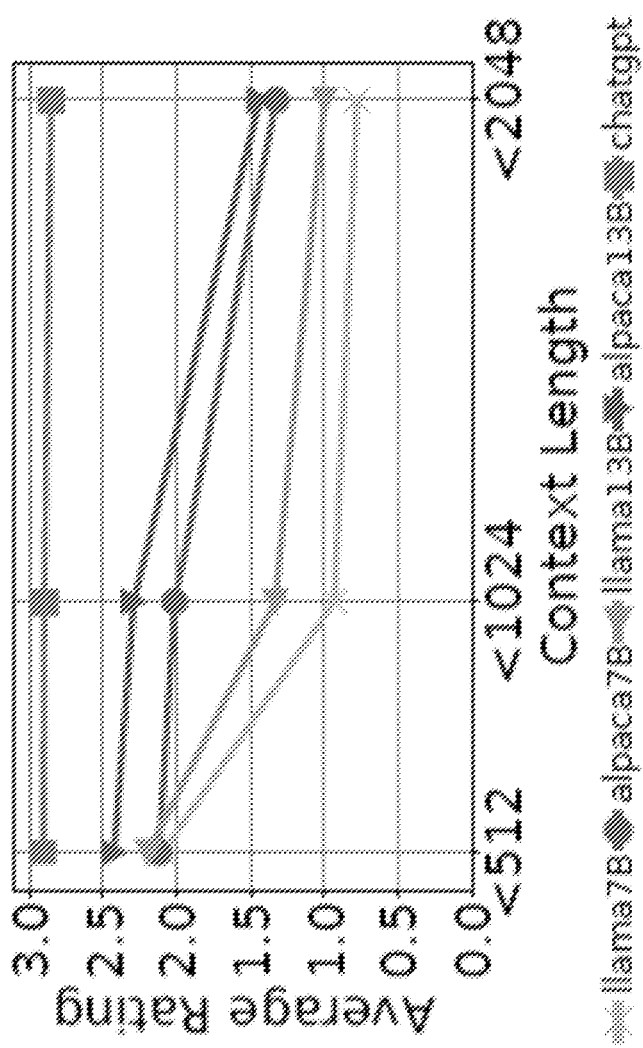

For each of LLM 105a-n, the language model 118 may output a specificity score under each metric. For example, the language model 118 may be prompted to output a specificity score in a range, e.g., 0-3. The language model 118 may be prompted to rank LLMs 105a-n based on the specificity scores under one or more metrics. In some embodiments, the language model 118 determines the specificity score of an LLM by comparing its respective answers to human annotations/feedback. For example, FIG. 6A illustrates the ranking of a plurality of NLP models under each metric based on their specificity scores. The NLP models in FIG. 6, e.g., Llama7B, Alpaca7B, Llama13B, Alpaca13B, and ChatGPT, may be examples of LLMs 105a-n. In some embodiments, the language model 118 may choose the ranking of one of the metrics and output a recommendation 120 that is the highest ranked NLP under the metric. For example, the language model 118 may select a metric based on prompt 102, such as Accuracy, and output ChatGPT as recommendation 120. In some embodiments, the language model 118 may parse prompt 102 and determine a metric/ranking based on its importance to prompt 102. The language model 118 may select at least one metric that is of highest ranking/importance. In some embodiments, the language model 118 may choose more than one metrics, compute an average specificity score of the LLMs under the more than one metrics, and rank the LLMs based on the average specificity score. FIG. 6B illustrates the ranking of a plurality of LLMs shown in FIG. 6A based on their average specificity scores of four metrics: coherence, relevance, accuracy, and factual consistency. FIG. 6B includes the average specificity scores corresponding to questions 112a (QG-Summary) and questions 112b (QG-Passage). FIG. 6C illustrates the ranking of a plurality of NLP models shown in FIG. 6A as a function of token length, based on their average specificity score of the four metrics.

With reference to FIG. 1C, a recommendation 120 of the highest ranking in average specificity score may be generated, e.g., and presented via a user interface 122.

It is to be noted that the language model 118 is shown to be separate from language models 106 and 110, for illustrative purpose only. In one implementation, language models 106, 110 and 118 may be the same, or different LLMs. For example, GPT-4 may be employed as the language model 118 for evaluation, while a smaller LLM such as GPT-3.0 may be employed as the language model 106 or 110.

Computer and Network Environment

Figure 2A:
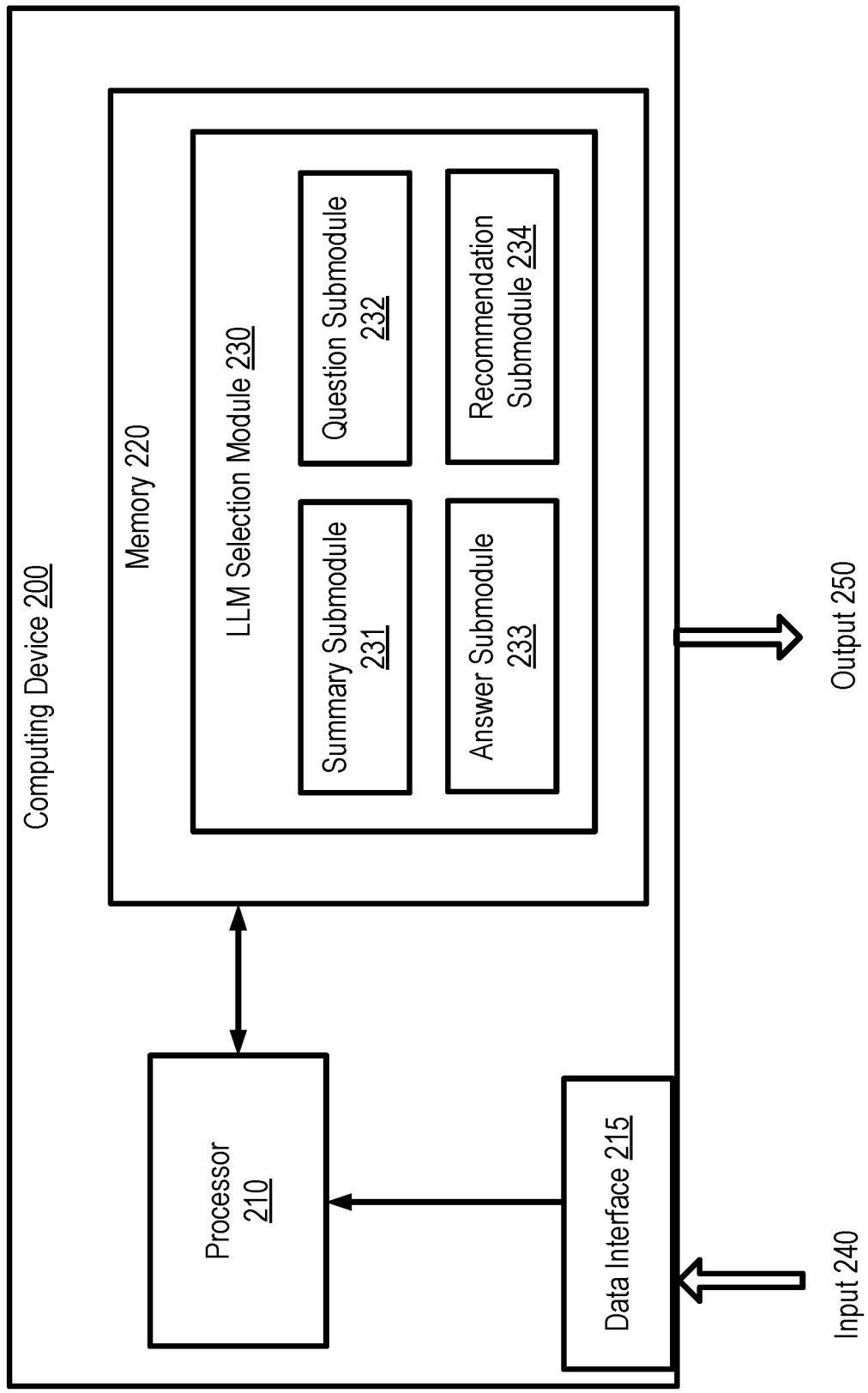
FIG. 2A is a simplified diagram illustrating a computing device implementing the LLM selection framework described in FIGS. 1A-1C, according to some embodiments.

FIG. 2A is a simplified diagram illustrating a computing device implementing the LLM selection framework 100 described in FIGS. 1A-1C, according to one embodiment described herein. As shown in FIG. 2A, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for LLM selection module 230 that may be used to implement and/or emulate the systems and models, and/or to implement any of the methods described further herein. LLM selection module 230 may receive input 240 such as an input training data (e.g., a source document for training and a user defined prompt) via the data interface 215 and generate an output 250 which may be a recommendation of a NLP model.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as a source document and a user defined prompt, from a user via the user interface.

In some embodiments, the LLM selection module 230 is configured to recommend an LLM for a user's custom AI application. The LLM selection module 230 may further include a summary submodule 231 (e.g., similar to language model 106 in FIG. 1B), a question submodule 232 (e.g., similar to language model 110 in FIG. 1B), an answer submodule 233 (e.g., LLMs 105a-n in FIG. 1C), and a recommendation submodule 234 (e.g., similar to language model 118 in FIG. 1C). It is to be noted that similar as described in relation to FIGS. 1A-1C, submodules 231-234 may be located external to computing device 200, accessible via the data interface 215.

Summary submodule 231 may generate a prompt for summary generalization based on an input of a source document (e.g., source document 104). Summary submodule 231 may receive the source document, and transmit the prompt and the source document to the first language model (e.g., first language model 106). Question submodule 232 may generate a prompt for a plurality of questions (e.g., questions 112) based on the summary (e.g., summary 108) and/or the source document. Question submodule 232 may receive the summary from the first language model, and transmit the prompt, the summary, and the source document (optional) to the second language model (e.g., second language model 110). Answer submodule 233 may receive a user defined prompt (e.g., prompt 102) and the questions from the second language model. Answer submodule 233 may generate a prompt to one or more NLP models (e.g., NLP models 114a-114m) such that the NLP models generate a plurality of answers (e.g., answers 116a-116m) based on an input of a user defined prompt combined with the questions generated by question submodule 232. Answer submodule 233 may transmit the user defined prompt, the questions to the one or more NLP models and the prompt to the one or more NLP models. In some embodiments, each of the NLP models is prompted to generate a set of answers (e.g., answers 116a, 116b, . . . , 116n) to the input. Recommendation submodule 234 may generate a prompt for a third language model (e.g., third language model 118) to evaluate the answers generated by question submodule 232, compute for a ranking of the NLP models based on one or more metrics, and generate a recommendation of LLM(s) based on the ranking. Recommendation submodule 234 may also receive the sets of answers from the one or more NLP models, and transmit the sets of answers to the third language model. Recommendation submodule 234 may the recommendation, e.g., one or more of the NLP models with the highest ranking, from the third language model, and may transmit the recommendation to the user (or user interface 122).

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2B:
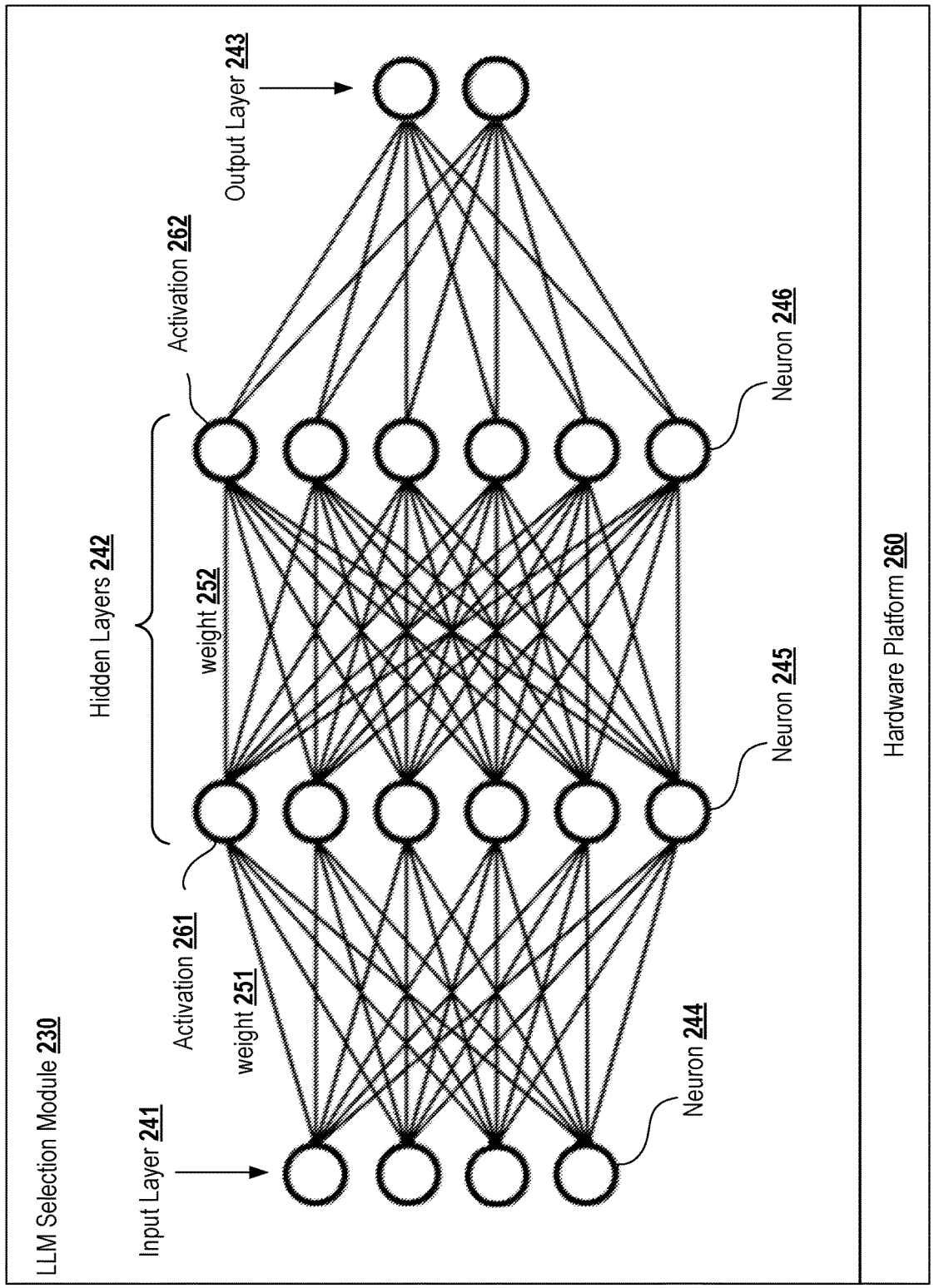
FIG. 2B is a simplified diagram illustrating a neural network structure, according to some embodiments.

FIG. 2B is a simplified diagram illustrating the neural network structure implementing the LLM selection module 230 described in FIG. 2A, according to some embodiments. In some embodiments, the LLM selection module 230 and/or one or more of its submodules 231-234 may be implemented at least partially via an artificial neural network structure shown in FIG. 2B. The neural network comprises a computing system that is built on a collection of connected units or nodes, referred to as neurons (e.g., 244, 245, 246). Neurons are often connected by edges, and an adjustable weight (e.g., 251, 252) is often associated with the edge. The neurons are often aggregated into layers such that different layers may perform different transformations on the respective input and output transformed input data onto the next layer.

For example, the neural network architecture may comprise an input layer 241, one or more hidden layers 242 and an output layer 243. Each layer may comprise a plurality of neurons, and neurons between layers are interconnected according to a specific topology of the neural network topology. The input layer 241 receives the input data (e.g., 240 in FIG. 2A), such as a source document and a user defined prompt. The number of nodes (neurons) in the input layer 241 may be determined by the dimensionality of the input data (e.g., the length of a vector of the source document). Each node in the input layer represents a feature or attribute of the input.

The hidden layers 242 are intermediate layers between the input and output layers of a neural network. It is noted that two hidden layers 242 are shown in FIG. 2B for illustrative purpose only, and any number of hidden layers may be utilized in a neural network structure. Hidden layers 242 may extract and transform the input data through a series of weighted computations and activation functions.

For example, as discussed in FIG. 2A, the LLM selection module 230 receives an input 240 of source document and a user defined prompt, and transforms the input into an output 250 of a recommendation of a NLP model. To perform the transformation, each neuron receives input signals, performs a weighted sum of the inputs according to weights assigned to each connection (e.g., 251, 252), and then applies an activation function (e.g., 261, 262, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 241 is transformed into rather different values indicative data characteristics corresponding to a task that the neural network structure has been designed to perform.

The output layer 243 is the final layer of the neural network structure. It produces the network's output or prediction based on the computations performed in the preceding layers (e.g., 241, 242). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the LLM selection module 230 and/or one or more of its submodules 231-234 may comprise the transformative neural network structure of layers of neurons, and weights and activation functions describing the non-linear transformation at each neuron. Such a neural network structure is often implemented on one or more hardware processors 210, such as a graphics processing unit (GPU). An example neural network may be ChatGPT, GPT-4, Alpaca, Llama, and/or the like.

In one embodiment, the LLM selection module 230 and its submodules 231-234 may be implemented by hardware, software and/or a combination thereof. For example, the LLM selection module 230 and its submodules 231-234 may comprise a specific neural network structure implemented and run on various hardware platforms 260, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 260 used to implement the neural network structure is specifically configured based on factors such as the complexity of the neural network, the scale of the tasks (e.g., training time, input data scale, size of training dataset, etc.), and the desired performance.

In one embodiment, the neural network based LLM selection module 230 and one or more of its submodules 21-234 may be trained by iteratively updating the underlying parameters (e.g., weights 251, 252, etc., bias parameters and/or coefficients in the activation functions 261, 262 associated with neurons) of the neural network based on the loss, e.g., cross entropy. For example, during forward propagation, the training data such as source document and user defined prompt are fed into the neural network. The data flows through the network's layers 241, 242, with each layer performing computations based on its weights, biases, and activation functions until the output layer 243 produces the network's output 250. In some embodiments, output layer 243 produces an intermediate output on which the network's output 250 is based.

The output generated by the output layer 243 is compared to the expected output (e.g., a "ground-truth") from the training data, to compute a loss function that measures the discrepancy between the predicted output and the expected output. Given the loss, the negative gradient of the loss function is computed with respect to each weight of each layer individually. Such negative gradient is computed one layer at a time, iteratively backward from the last layer 243 to the input layer 241 of the neural network. These gradients quantify the sensitivity of the network's output to changes in the parameters. The chain rule of calculus is applied to efficiently calculate these gradients by propagating the gradients backward from the output layer 243 to the input layer 241.

Parameters of the neural network are updated backwardly from the last layer to the input layer (backpropagating) based on the computed negative gradient using an optimization algorithm to minimize the loss. The backpropagation from the last layer 243 to the input layer 241 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as recommend a NLP based on a source document and a user defined prompt.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in LLM selection.

Figure 3:
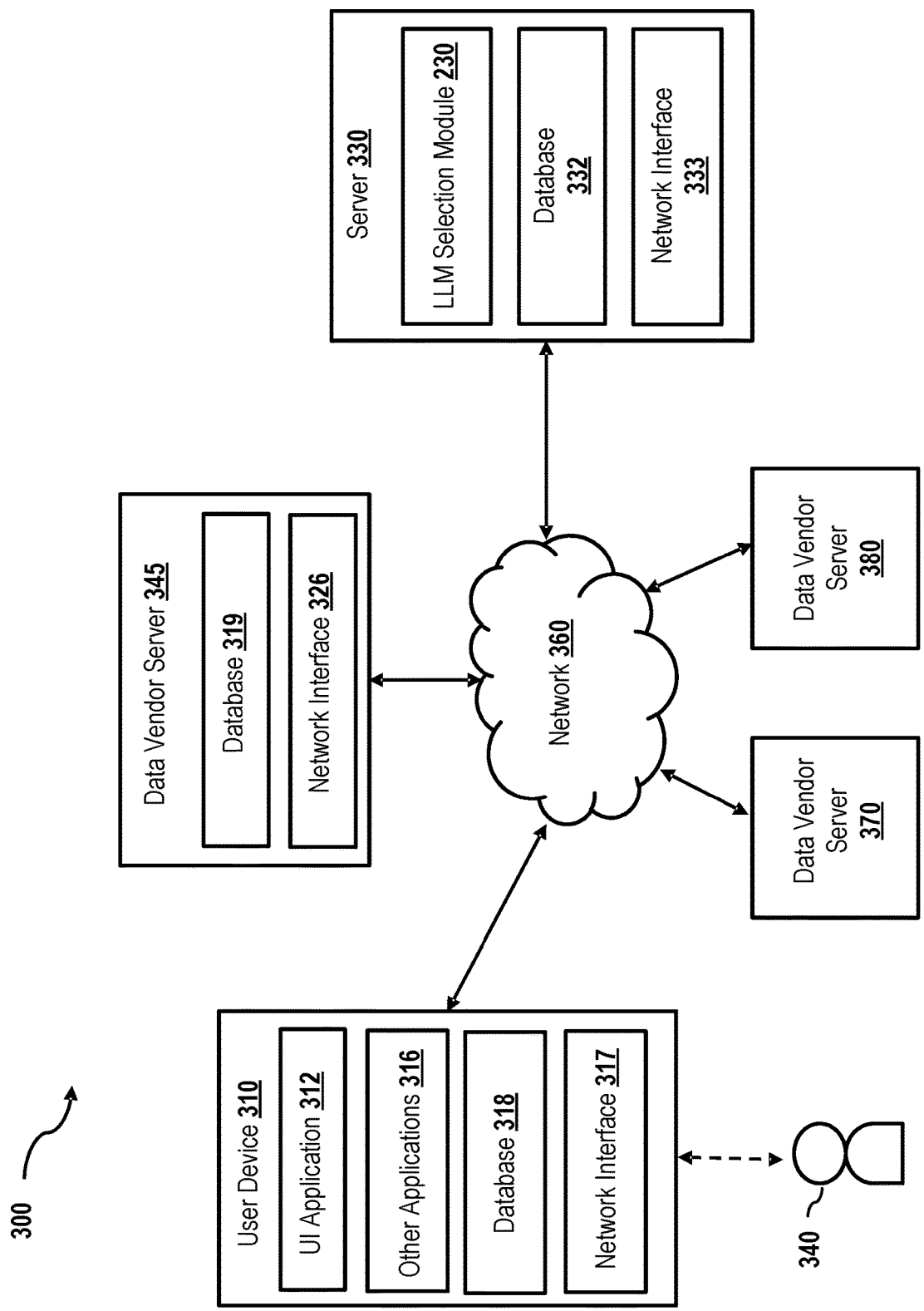
FIG. 3 is a simplified block diagram of a networked system suitable for implementing the LLM selection framework described in FIGS. 1A-1C and other embodiments described herein.

FIG. 3 is a simplified block diagram of a networked system 300 suitable for implementing the LLM selection framework described in FIGS. 1A-1C and other embodiments described herein. In one embodiment, system 300 includes the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2A, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating a recommended NLP model, such as ChatGPT, from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view the recommendation, which is the name of a NLP model such as ChatGPT.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including a source document and a user defined prompt to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the LLM selection module 230 and its submodules described in FIG. 2A. In some implementations, LLM selection module 230 may receive data from database 319 at the data vendor server 345 via the network 360 to generate a recommendation of NLP models. The generated recommendation may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the LLM selection module 230. In one implementation, the database 332 may store previously generated summary, questions, answers, specificity scores, and NLP model recommendations, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Work Flows

Figure 5:
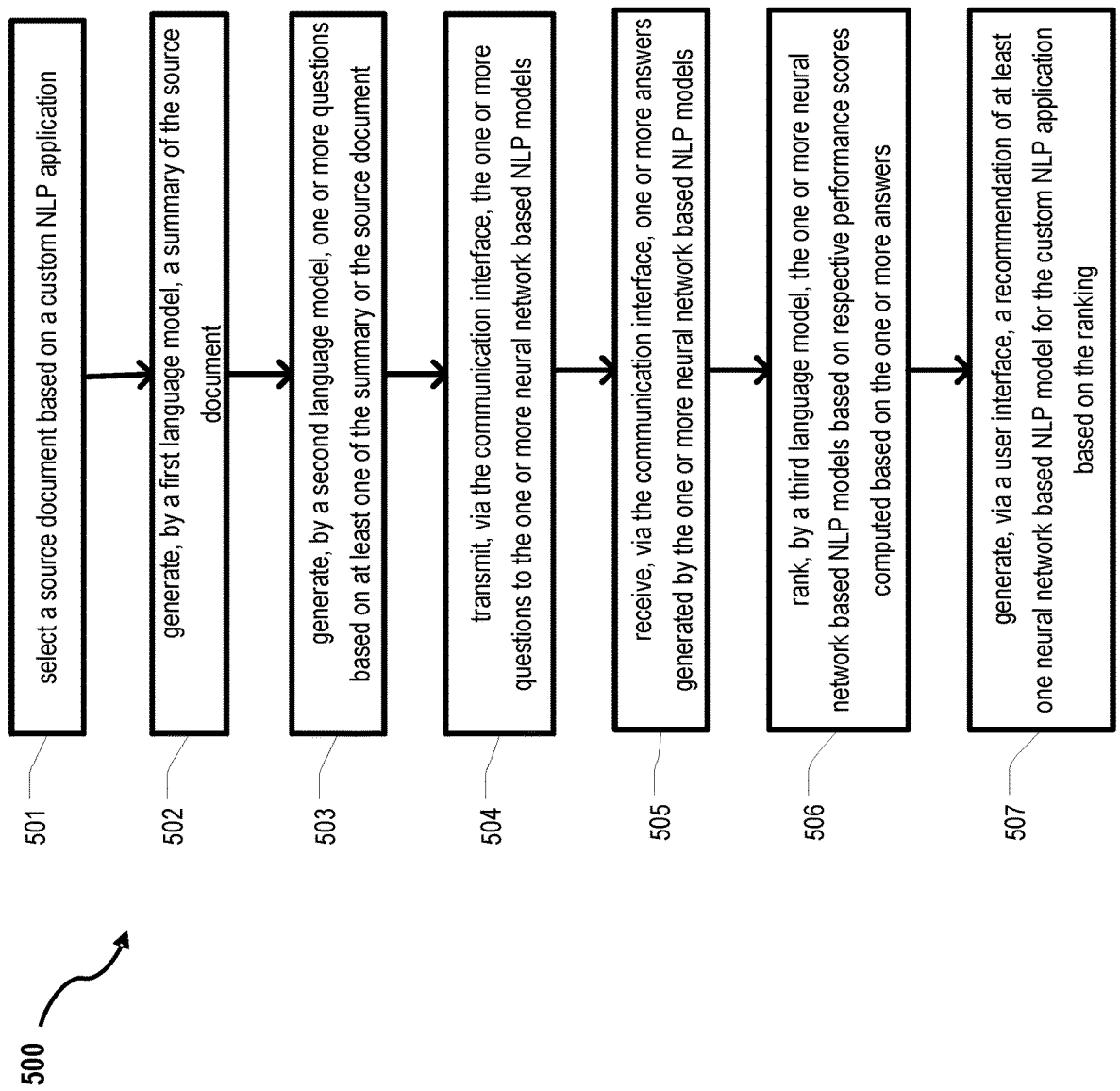
FIG. 5 is an example logic flow diagram illustrating a method of selecting an AI stack based on the framework shown in FIGS. 1A-1C, according to some embodiments.

FIG. 5 is an example logic flow diagram illustrating a method of LLM selection for building a custom AI stack based on the framework shown in FIGS. 1A-1C, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the LLM selection module 230 (e.g., FIGS. 2A and 3) that performs LLM selection for a user's custom AI application. For ease of illustration, method 500 is illustrated in view of FIGS. 1A-1C, 4A, 4B, 6A-6C.

As illustrated, the method 500 includes a number of enumerated steps, but aspects of the method 500 may include additional steps before, after, and in between the enumerated steps. In some aspects, one or more of the enumerated steps may be omitted or performed in a different order.

At step 501, a source document is selected based on a custom NLP application. Referring back to FIG. 1B, a source document may be selected as relevant to the custom NLP application, e.g., based on the knowledge domain, to assist the selection of LLMs.

At step 502, a summary of the source document is generated by a first language model. Referring back to FIG. 1B, first language model 106 may generate a summary 108 in response to an input of source document 104.

At step 503, one or more questions are generated based on at least one of the summary or the source document by a second language model, which may be the same or a different language model from the first language model. Referring back to FIG. 1B, second language model 110 may generate one or more questions 112 based on summary 108 and/or source document 104.

At step 504, the one or more questions (e.g., 112 in FIGS. 1B-1C) are transmitted to the one or more neural network based NLP models (e.g., LLMs 105a-n in FIG. 1A) via a communication interface.

At step 505, one or more answers (e.g., 116a-n in FIG. 1C) generated by the one or more neural network based NLP models (e.g., LLMs 105a-n) are received via the communication interface, e.g., at server 110 in FIG. 1A.

At step 506, the one or more neural network based NLP models may be ranked based on respective performance scores computed based on the one or more answers. Referring back to FIGS. 1C, 4A, 4B, and 6A-6C, a language model 118, which may be the same or a different language model than language models 106 or 110, may compute specificity scores of each LLM under one or more metrics, and rank the LLMs based on the specificity scores. For example, a higher score corresponds to a higher ranking of a LLM.

At step 507, a recommendation of at least one neural network based NLP model for the custom NLP application is generated via a user interface based on the ranking. Referring back to FIG. 1C, the language model 118 may generate a recommendation (e.g., 120), which may include the name of one of the LLMs. A user interface may be caused to display the recommendation, e.g., the name of the LLM.

In some embodiments, the method further includes: receiving, via the user interface, a user defined prompt relating to the custom NLP application; and transmitting the user defined prompt and the one or more questions to the one or more neural network based NLP models. The one or more answers are generated based on an input combining one of the one or more questions and the user defined prompt.

In some embodiments, the generating, by the second language model, the one or more questions includes: generating, by the second language model, a plurality of initial questions based on at least one of the summary of the source document; prompting, the second language model, with a complexity evaluation question for evaluating a complexity of each of the initial questions; determining, by the second language model, a percentage of the plurality of initial questions that passes the complexity evaluation question; and selecting the percentage of the plurality of initial questions to be the one or more questions.

In some embodiments, the ranking, by the third language model, the one or more neural network based NLP models includes: computing one or more specificity scores corresponding to the one or more neural network based NLP models by respectively comparing the one or more answers with human annotations; and ranking the one or more neural network based NLP models based on the question specificity scores.

In some embodiments, the ranking, by the third language model, the one or more neural network based NLP models further includes: computing average specificity scores based on the one or more question specificity scores for the one or more neural network based NLP models; and ranking the one or more neural network based NLP models based on the average specificity scores.

In some embodiments, the one or more specificity scores are based on at least one of a coherency metric, a relevance metric, a factual consistency metric, or an accuracy metric.

In some embodiments, the method further includes receiving, from a user interface, feedback from a user relating to a quality of the one or more answers.

In some embodiments, the first language model, the second language model and the third language models are a same language model located on an external server.

In some embodiments, the first language model, the second language model and the third language models are different language models located on different external servers.

Example Results

The question generation process may be formulated as a two-step process: (1) summarization and (2) question generation from summary.

Step (1): summarization. First, section wise passages may be collected from Wikipedia as described. Then, ChatGPT (gpt-turbo-3.5) is prompted to generate summary of the original document (e.g., the section wise passages). In order to provide more context to ChatGPT, information about the title and the domain of the article are provided in the passage.

Step (2): Question generation from summary. In this step, ChatGPT may be prompted to generate questions using document summaries as context. To avoid random order question generation, ChatGPT may be instructed to provide top-3 complex questions to answer. To demonstrate the usefulness of the question generation process, a baseline is established with the same instructions where questions are directly generated from the passage. In some embodiments, 3 questions for 50 passages in each domain totaling to 1350 questions are generated for each setting.

Evaluation of generated question complexity. Pang et al. ("*QuALITY: Question answering with long input texts, yes!*" In Proceedings of the 2022 Conference of the North American Chapter of the Association for Computational Linguistics: Human Language Technologies, pages 5336-5358, Seattle, United States) designed extensive annotation guidelines to assess the complexity of questions. Of the questions rated as 'HARD' by humans, 26.7% of the questions (20.2% higher than the easier ones) needed at least one-third or more of the given information to be answered. In order to assess the quality of generated questions, we prompt Chat-GPT with the questions (FIG. 4A) for (1) From the passage (QG-Passage) (2) From the summary (QG-Summary). Following prior work, by majority voting the questions that are rated as unanswerable by ChatGPT are excluded by prompting the questions with different top_p={0.8, 0.9.1}. After filtering, 1278 generated questions remain from each setting.

As few-shot setting is infeasible in the setting due to context length, model performance is compared on zero-shot evaluation. The following models are prompted to generate free-form text as answers on our final evaluation dataset: ChatGPT (OpenAI, 2023), Alpaca-7B, 13B (Taori et al., "*Stanford alpaca: An Instruction-Following Llama Model*", https://github.com/tatsu-lab/stanford_alpaca, 2023), LLaMa-7B,13B (Touvron et al., "*Llama: Open and Efficient Foundation Language Models*", 2023). OpenAI API for ChatGPT and load checkpoints are used for open-source LLMs from HuggingFace 1. The experiments do not consider input beyond 2k sequence length for fair comparisons with other models. Generating questions from Alpaca was also tested. The Alpaca was found to not follow instructions and often generate irrelevant content.

GPT-4 as evaluator has shown high correlation with human evaluation in long form text generation tasks like summarization (Liu et al., "*G-eval: Nlg Evaluation Using GPT-4 with Better Human Alignment*", 2023) surpassing other auto-evaluation metrics like ROUGE and BLEU scores. Since LLMs are expected to generate free form answers for setting, prior works on long-form text generation metrics (Fabbri et al., "*Summeval: Re-evaluating Summarization Evaluation*", 2020) are adopted in the evaluation for coherency, consistency, accuracy, and relevance. Basically, the definitions are adopted and guidelines for human evaluation are used to our method as shown below:

Coherency is referred to as an answer should be well-structured and well-organized and should not just be a heap of related information. Relevance is referred to as an answer should be relevant to the question and the context. The answer should be concise and avoid drifting from the question being asked. Factual consistency is referred to as the context should be the primary source for the answer. The answer should not contain fabricated facts and should entail information present in the context. Accuracy is referred to as an answer should be satisfactory and complete to the question being asked. Measure the correctness of the answer by checking if the response answers the presented question.

GPT-4 is prompted to rate answers on a scale from 0 to 3 (higher the better) on all of the four metrics. All the ratings obtained from GPT-4 are averaged and the results are presented in FIG. 6B.

It is hypothesized that an optimal prompt should always prefer human answers and not be biased towards model-generated answers. Laskar et al. ("*A Systematic Study and Comprehensive Evaluation of ChatGPTt on Benchmark Datasets*", 2023) show that LLMs like ChatGPT still underperform to humans on Truthful QA dataset (Lin et al., "*Truthfulqa: Measuring How Models Mimic Human Falsehoods*", 2022). Hence, proxy testing is performed with GPT-4 on Truthful QA dataset in order to verify the reliability and faithfulness of our evaluation prompt. The generated answers from Chat-GPT and open-source LLMs are tested against the ground truth on randomly sampled 50 test instances. It is found that the evaluation prompt with GPT-4 prompt prefers human-written answers for factual consistency and correctness over model-generated ones more than >90% of the time. In addition, human evaluation of LLM generated answers is performed and the correlation of GPT-4 evaluation with human evaluation is discussed.

The results show that ChatGPT outperforms other LLMs in all the metrics by a wide margin from 22.4%-40.1% against the second best performing LLM (Alpaca-13B). However, all the models including ChatGPT generate less accurate and relevant answers for QG-Summary when compared to QG-Passage, while the gap is much larger in open-source LLMs. It is also found that most of the LLMs find context important to generate answers. However, the gap is much smaller for QG-Passage (avg. gap of 0.12 v.s. 0.2). Surprisingly, Alpaca-7B, 13B models perform better w/o context for QG-Passage. It is hypothesized that questions directly generated from the context passage can be simple that could be directly answered from the parametric knowledge of LLMs without additional context. On further analysis, it is observed that Alpaca-7B,13B performance drops significantly in longer contexts (FIG. 6C). It is hypothesized that in a constrained sequence length setting, adding supporting context (even gold passage) may not be always helpful.

Performance of LLMs on different metrics is studied. FIG. 6A presents the performance of models across different metrics for QG-Summary. Two trends are observed: (1) Open-source base LLMs (Llama-7B,13B) suffer at all fronts significantly on generated answer quality whereas distilled models perform better than their counterparts (Llama) on all the settings; (2) QG-Summary provides a more challenging setting for all the LLMs. Specifically, it is noticed that degradation in coherency score is negligent on ChatGPT and Alpaca-13B, while other metrics like relevance, answer accuracy and factual consistency degrade consistently. Open-source LLMs are found to drift from the question, generate partially correct answers, and repeat more frequently in QG-Summary setting leading to lower scores. This further confirm that the proposed evaluation method QG-Summary challenges LLMs for deeper reasoning capabilities.

Context Length Analysis is studied. The effect of context length across LLMs is analyzed in our proposed setting (QG-Summary). As expected, ChatGPT remains robust to context length until 2k tokens with Llama variants performing worse than other models (FIG. 6C). It is found that distilled models (Alpaca) being consistent until 1024 tokens. However, beyond 1024 tokens, the performance degrades at a higher rate than Llama.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A system for selecting a neural network based natural language processing (NLP) model for building a custom artificial intelligence (AI) stack for a user, the system comprising:
   a communication interface that established one or more connections to one or more external servers hosting one or more neural network based NLP models;
   a memory storing a plurality of processor-executable instructions; and
   a processor executing the processor-executable instructions to perform operations comprising:
   selecting a source document based on a custom NLP application;
   generating, by a first language model, a summary of the source document;
   generating, by a second language model, one or more questions based on at least one of the summary or the source document;
   transmitting, via the communication interface, the one or more questions to the one or more neural network based NLP models;
   receiving, via the communication interface, one or more answers generated by the one or more neural network based NLP models;
   ranking, by a third language model, the one or more neural network based NLP models based on respective performance scores computed based on the one or more answers; and
   generating, via a user interface, a recommendation of at least one neural network based NLP model for the custom NLP application based on the ranking.

2. The system of claim 1, wherein the operations further comprise:
   receiving, via the user interface, a user defined prompt relating to the custom NLP application; and
   transmitting the user defined prompt and the one or more questions to the one or more neural network based NLP models,
   wherein the one or more answers are generated based on an input combining one of the one or more questions and the user defined prompt.

3. The system of claim 1, wherein the operation of generating, by the second language model, the one or more questions comprises:
   generating, by the second language model, a plurality of initial questions based on at least one of the summary of the source document;
   prompting, the second language model, with a complexity evaluation question for evaluating a complexity of each of the initial questions;
   determining, by the second language model, a percentage of the plurality of initial questions that passes the complexity evaluation question; and
   selecting the percentage of the plurality of initial questions to be the one or more questions.

4. The system of claim 1, wherein the operation of ranking, by the third language model, the one or more neural network based NLP models comprises:
   computing one or more specificity scores corresponding to the one or more neural network based NLP models by respectively comparing the one or more answers with human annotations; and
   ranking the one or more neural network based NLP models based on the question specificity scores.

5. The system of claim 4, wherein the ranking, by the third language model, the one or more neural network based NLP models further comprises:
   computing average specificity scores based on the one or more question specificity scores for the one or more neural network based NLP models; and
   ranking the one or more neural network based NLP models based on the average specificity scores.

6. The system of claim 1, wherein the one or more specificity scores are based on at least one of a coherency metric, a relevance metric, a factual consistency metric, or an accuracy metric.

7. The system of claim 1, wherein the operations further comprise:
   receiving, from a user interface, feedback from a user relating to a quality of the one or more answers.

8. The system of claim 1, wherein the first language model, the second language model and the third language models are a same language model located on an external server.

9. The system of claim 1, wherein the first language model, the second language model and the third language models are different language models located on different external servers.

10. A method of selecting a neural network based natural language processing (NLP) model for building a custom artificial intelligence (AI) stack for a user, the method comprising:
    establishing, via a communication interface, one or more connections to one or more external servers hosting one or more neural network based NLP models;
    selecting a source document based on a custom NLP application;
    generating, by a first language model, a summary of the source document;
    generating, by a second language model, one or more questions based on at least one of the summary or the source document;
    transmitting, via the communication interface, the one or more questions to the one or more neural network based NLP models;
    receiving, via the communication interface, one or more answers generated by the one or more neural network based NLP models;
    ranking, by a third language model, the one or more neural network based NLP models based on respective performance scores computed based on the one or more answers; and
    generating, via a user interface, a recommendation of at least one neural network based NLP model for the custom NLP application based on the ranking.

11. The method of claim 10, further comprising:
    receiving, via the user interface, a user defined prompt relating to the custom NLP application; and
    transmitting the user defined prompt and the one or more questions to the one or more neural network based NLP models,
    wherein the one or more answers are generated based on an input combining one of the one or more questions and the user defined prompt.

12. The method of claim 10, wherein the generating, by the second language model, the one or more questions comprises:
    generating, by the second language model, a plurality of initial questions based on at least one of the summary of the source document;

prompting, the second language model, with a complexity evaluation question for evaluating a complexity of each of the initial questions;

determining, by the second language model, a percentage of the plurality of initial questions that passes the complexity evaluation question; and selecting the percentage of the plurality of initial questions to be the one or more questions.

13. The method of claim 10, wherein the ranking, by the third language model, the one or more neural network based NLP models comprises:

computing one or more specificity scores corresponding to the one or more neural network based NLP models by respectively comparing the one or more answers with human annotations; and ranking the one or more neural network based NLP models based on the question specificity scores.

14. The method of claim 13, wherein the ranking, by the third language model, the one or more neural network based NLP models further comprises:

computing average specificity scores based on the one or more question specificity scores for the one or more neural network based NLP models; and ranking the one or more neural network based NLP models based on the average specificity scores.

15. The method of claim 10, wherein the one or more specificity scores are based on at least one of a coherency metric, a relevance metric, a factual consistency metric, or an accuracy metric.

16. The method of claim 10, further comprising:

receiving, from a user interface, feedback from a user relating to a quality of the one or more answers.

17. The method of claim 10, wherein the first language model, the second language model and the third language models are a same language model located on an external server.

18. The method of claim 10, wherein the first language model, the second language model and the third language models are different language models located on different external servers.

19. A non-transitory machine-readable medium comprising a plurality of machine-executable instructions which, when executed by one or more processors, are adapted to cause the one or more processors to perform operations comprising:

establishing, via a communication interface, one or more connections to one or more external servers hosting one or more neural network based NLP models;

selecting a source document based on a custom NLP application;

generating, by a first language model, a summary of the source document;

generating, by a second language model, one or more questions based on at least one of the summary or the source document;

transmitting, via the communication interface, the one or more questions to the one or more neural network based NLP models;

receiving, via the communication interface, one or more answers generated by the one or more neural network based NLP models;

ranking, by a third language model, the one or more neural network based NLP models based on respective performance scores computed based on the one or more answers; and generating, via a user interface, a recommendation of at least one neural network based NLP model for the custom NLP application based on the ranking.

20. The non-transitory machine-readable medium of claim 19, wherein the operations further comprise:

receiving, via the user interface, a user defined prompt relating to the custom NLP application; and transmitting the user defined prompt and the one or more questions to the one or more neural network based NLP models, wherein the one or more answers are generated based on an input combining one of the one or more questions and the user defined prompt.

* * * * *